United States Patent
Toshitaka

[19]

[11] Patent Number: 6,036,512
[45] Date of Patent: Mar. 14, 2000

[54] ELECTRICAL CONNECTOR WITH CARD-EJECTION MECHANISM HAVING TWO PIVOT POINTS FOR EASIER EJECTION

[75] Inventor: Kusuhara Toshitaka, Kanagawa, Japan

[73] Assignee: The Whitaker Corporation, Wilmington, Del.

[21] Appl. No.: 09/108,367

[22] Filed: Jun. 30, 1998

[30] Foreign Application Priority Data

Jun. 30, 1997 [JP] Japan .................................. 9-189191

[51] Int. Cl.⁷ .................................................. H01R 13/62
[52] U.S. Cl. ............................................................ 439/159
[58] Field of Search .................................. 439/152, 159, 439/160

[56] References Cited

U.S. PATENT DOCUMENTS

| | | | |
|---|---|---|---|
| 5,179,871 | 1/1993 | Orimoto et al. | 74/516 |
| 5,197,894 | 3/1993 | Koike | 439/159 |
| 5,368,493 | 11/1994 | O'Brien et al. | 439/160 |
| 5,383,789 | 1/1995 | Watanabe | 439/159 |
| 5,421,737 | 6/1995 | Chen et al. | 439/157 |
| 5,466,166 | 11/1995 | Law et al. | 439/159 |
| 5,588,850 | 12/1996 | Pan et al. | 439/92 |
| 5,683,258 | 11/1997 | Takano et al. | 439/159 |
| 5,707,245 | 1/1998 | Yamamoto et al. | 439/160 |

FOREIGN PATENT DOCUMENTS

| | | |
|---|---|---|
| 0 532 346 A2 | 3/1993 | European Pat. Off. . |
| 0 607 848 A2 | 7/1994 | European Pat. Off. . |
| 0 644 624 A2 | 3/1995 | European Pat. Off. . |
| 6-37947 | 5/1994 | Japan . |
| 6-4118 | 5/1994 | Japan . |
| 6-243299 | 9/1994 | Japan . |
| 8-241764 | 9/1996 | Japan . |
| WO 95/10129 | 4/1995 | WIPO . |
| WO 95/30205 | 11/1995 | WIPO . |
| WO 97/10691 | 3/1997 | WIPO . |
| WO 97/31511 | 8/1997 | WIPO . |

OTHER PUBLICATIONS

Abstract and drawings for File No. 50890 PCT, Serial No. 09/043,275 filed Mar. 11, 1998.

Primary Examiner—Steven L. Stephan
Assistant Examiner—Barry M. L. Standig

[57] ABSTRACT

The present invention provides a connector equipped with an ejection mechanism which can be assembled relatively easily, and which can be manufactured inexpensively. Connector (10) equipped with an ejection mechanism has a housing (20), which supports electrical contacts (15), and card-ejection members (50), which are attached so that they can pivot relative to the housing. Slots (72), which extend in the direction of card accommodation, are located in the housing, and a pair of columns (73, 74) are located inside each of the slots. Furthermore, a pair of recesses (55, 56) are located in each of the card-ejection members (50). The card-ejection members (50) are respectively accommodated in the slots (72), and they are prevented from slipping out by the engagement of projections (61) with the housing. In the first half of the ejection process in which a card (C) accommodated in the housing is disconnected from the contacts, the column (73) and recess (55) engage with each other to form a first pivoting center; in the second half of the ejection process, the column (74) and recess (56) engage with each other to form a second pivoting center to eject the card.

9 Claims, 5 Drawing Sheets

ELECTRICAL CONNECTOR WITH CARD-EJECTION MECHANISM HAVING TWO PIVOT POINTS FOR EASIER EJECTION

FIELD OF THE INVENTION

The present invention relates to a connector equipped with an ejection mechanism which is connected with a card, and which makes it possible to eject an accommodated card.

BACKGROUND OF THE INVENTION

One example of a conventional connector of this type is disclosed in Japanese Patent Application No. 8-241764. The connector is a module-type connector which can accommodate two cards above and below one another. A housing in which electrical terminals are mounted and a frame which accommodates the cards are provided separately above and below, and they are assembled to each other. The connector includes an arm used for ejection which is pivotable with respect to the housing. The arm is shaft-supported on a metal frame so that the arm can pivot.

The connector described above is advantageous in that it is flexible to accommodate numerous different card specifications by altering some of the parts; on the other hand, the assembly work required to assemble the parts of the connector is complicated. Furthermore, the number of parts required is large, and the cost is also relatively high.

SUMMARY OF THE INVENTION

Accordingly, an object of the present invention is to provide a connector equipped with an ejection mechanism which can be assembled relatively easily, and especially to provide a connector which is constructed so that an arm used for ejection can easily be attached to a housing.

Another object of the present invention is to provide a connector equipped with an ejection mechanism which is relatively inexpensive.

The present invention is a connector equipped with an ejection mechanism, the connector comprises a housing that accommodates a card, a card-ejection member is pivotable with respect to the housing and includes a card-engagement member that pushes out the card accommodated in the housing, the housing has a slot which accommodates the card-ejection member, column members are formed as integral parts of the housing inside the slot, recesses, which are capable of engaging with the column members, and a projection which engages with the housing so that the card-ejection member is prevented from slipping out of the slot, are located on the card-ejection member, and, when the card-ejection member is pivoted, respective sets of column members and recesses engage with each other and form pivoting centers.

Preferably, the slot opens on at least the side from which the card is accommodated, and the card-ejection member is accommodated from the same direction that the card is accommodated with respect to the housing.

Preferably, the column members are formed as a pair of members that are separated from each other in the lateral direction inside the slot. The recesses in the card-ejection member are also formed as a pair of recesses corresponding to the column members.

Preferably, the column member and recess that engage with each other vary between the first half and latter half of the pivoting of the card-ejection member, so that the position of the pivoting center is caused to move.

The column members are formed with a substantially circular cross-sectional shape.

Edge sections with an arcuate shape are formed in at least portions of the recesses.

The projection is formed at an intermediate position between the pair of recesses.

BRIEF DESCRIPTION OF THE DRAWINGS

An embodiment of the present invention will now be described by way of example with reference to the accompanying drawings in which:

FIG. 3b is a view looking from the right of FIG. 3a.

FIG. 4b is a view taken along line 4b—4b of FIG. 4a.

DETAILED DESCRIPTION OF THE INVENTION

Figure 1:
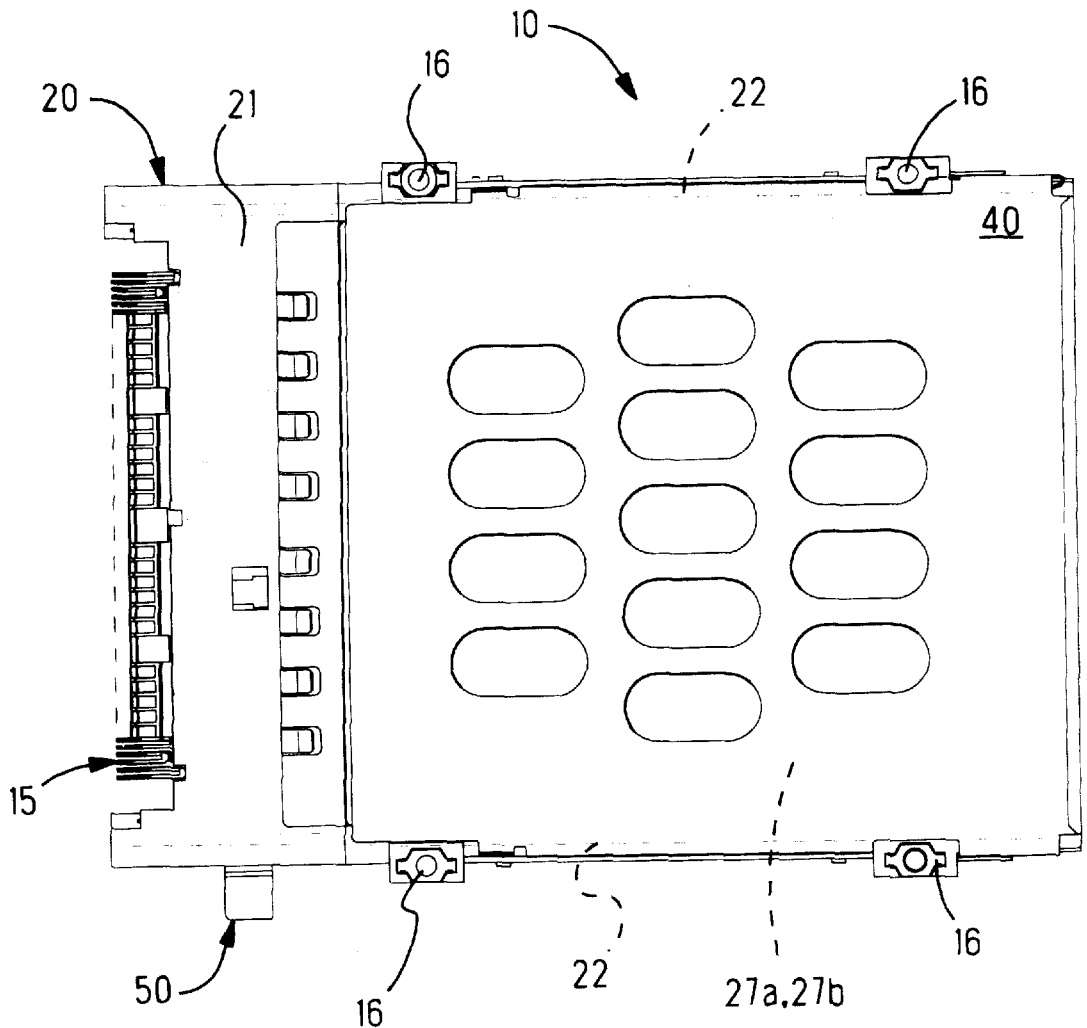
FIG. 1 is a top plan view of the present invention showing a connector equipped with an ejection mechanism.
Figure 2:
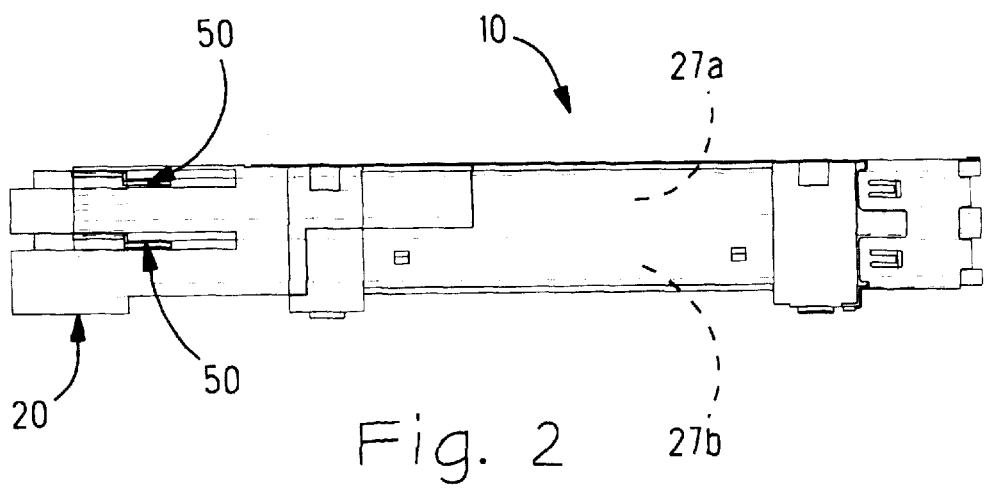
FIG. 2 is a side view of FIG. 1.

In FIG. 1, connector 10 equipped with an ejection mechanism has a housing 20, which supports a plurality of electrical contacts 15, frame plates 40 and card-ejection members 50, which form an ejection mechanism. As shown in FIG. 1, the housing 20 is integrally formed so that the housing 20 has a base section 21 and a pair of side sections 22 extending from both sides of the base section 21, thus it has a generally C-shape. Furthermore, as shown in FIG. 2, the housing 20 forms upper and lower card-accommodating members 27a, 27b. The frame plates 40 are disposed between the side sections 22 so that they cover the card-accommodating members 27a, 27b, thus protecting the card-accommodating members from the outside. Fastening means 16, which are used to fasten the connector 10 to a circuit board (not shown) by means of screws are disposed in positions on the side edges of the frame plates 40 and housing 20.

Figure 3A:
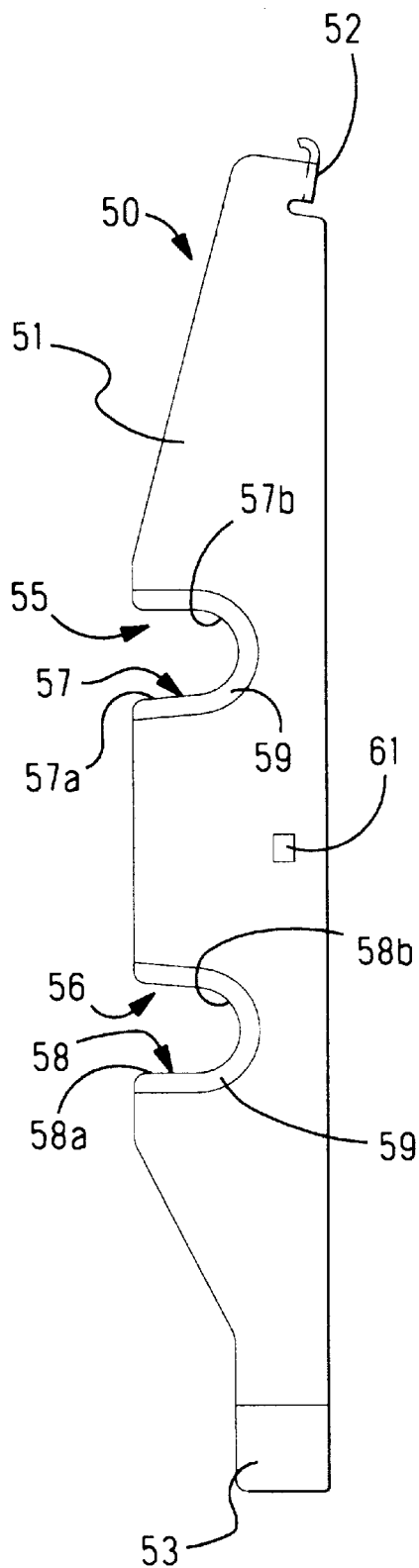
FIG. 3a is a top plan view of a card-ejection member.
Figure 3B:
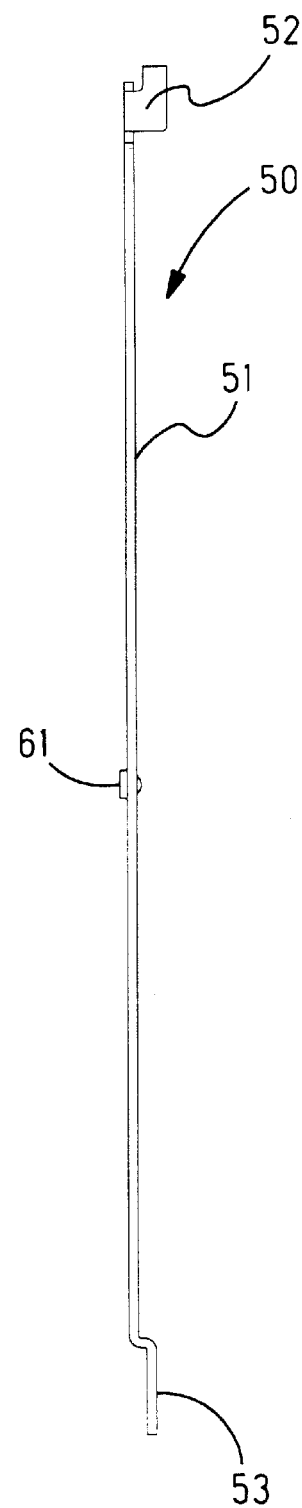

As shown in FIG. 3a, card-ejection member 50 is formed from a metal plate, and has a main section 51, a card-engagement member 52 formed by being bent at one end of the main section 51, and an engagement member 53 formed by bending the metal plate at the opposite end of the main section 51. As shown in FIG. 3b, the engagement member 53 is offset from the main section 51, but it is formed substantially parallel to the main section 51. An actuating member (not shown), which is used to perform the ejection operation manually, is attached to the engagement member 53. A pair of recesses 55, 56 are formed in the main section 51. The edges 57, 58, that delineate the recesses 55, 56 include linear portions 57a, 58a, which extend so that the recesses 55, 56 open outwardly, and arcuate portions 57b, 58b. Thin portions 59 of the main section 51 that extend along recesses 55, 56 will be described later. A projection 61, which engages with the housing 20 and will be described later, is located at approximately the central portion of the main section 51.

Figure 4A:
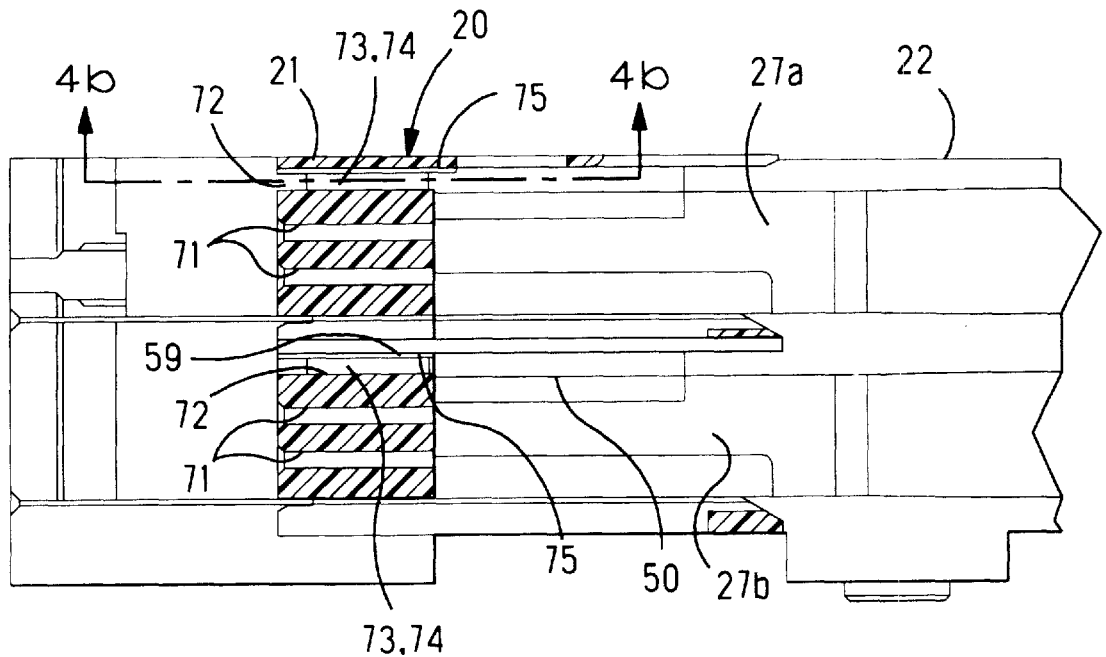
FIG. 4a is a part cross-sectional view of the housing.

As shown in FIG. 4a, slots 72, which are used to accommodate the card-ejection members 50, are located in the base section 21 of the housing 20 in positions separated from the contact-receiving cavities 71 that accommodate the contacts 15. Since it is necessary to accommodate two card-ejection members 50 corresponding to the upper and lower card-accommodating members 27a, 27b, slots 72 are located in two places, as shown in FIG. 4a. The slots 72 extend through the base section 21 of the housing 20 in the forward-rearward direction. Accordingly, if reference is made to a different shape of the housing 20, the number of molds required for the molding of the housing 20 is two; thus, it is seen that this structure allows molding with the minimum number of molds.

Figure 4B:
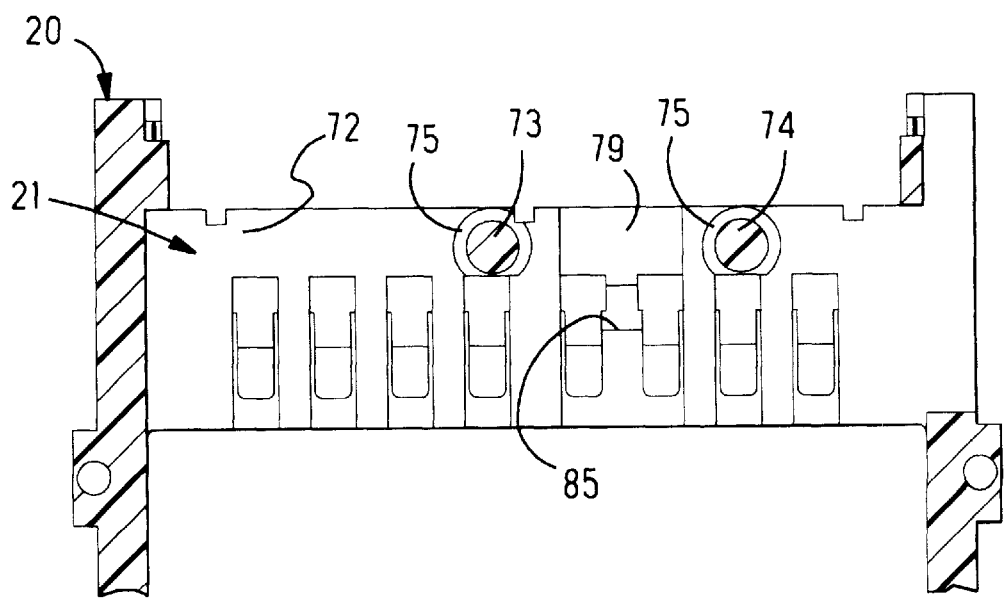

As seen by reference to FIGS. 4a and 4b, cylindrical columns 73, 74 are formed at two locations inside each slot 72. As shown in FIG. 4b, a thick portion 75 is formed at the root portion of each of the columns 73, 74. As a result, the portions of the housing 20 adjacent to the columns 73, 74 are reinforced. In FIG. 4a, the card-ejection members 50 accommodated inside the slots 72 are indicated by imaginary lines. The thin-plate portions 59 of each of the card-ejection members 50 are constructed so that there is no interference between the thick portions 75 of the housing 20 and the card-ejection members 50.

Furthermore, as shown in FIG. 4b, the intermediate area between the columns 73, 74 constitutes a recessed section 79, with a shoulder 85 being delineated by the recessed section 79. When each card-ejection member 50 is accommodated in the slot 72, the shoulder 85 acts in conjunction with the projection 61 to prevent the card-ejection member 50 from slipping out of the slot 72.

Figure 5A:
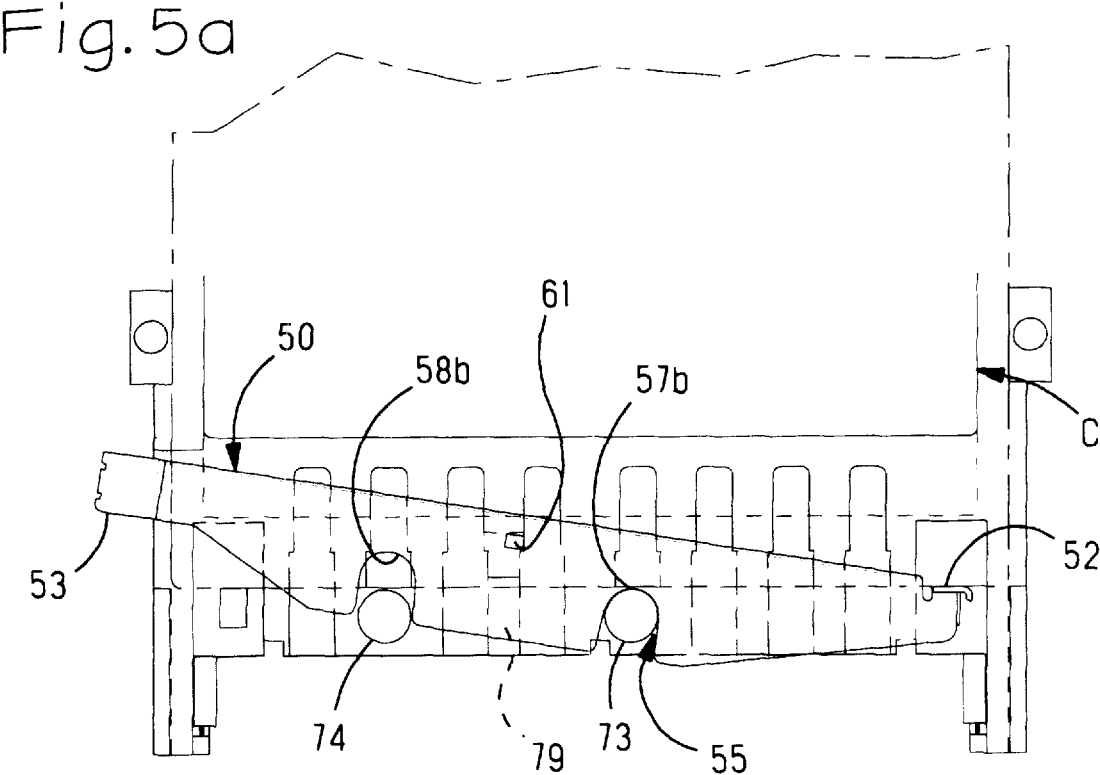
FIGS. 5a–5c are schematic views showing the operation of the card-ejection member.

In a state in which a card C is completely accommodated as shown in FIG. 5a, contacts (not shown) and contacts inside the card C are engaged so that an electrical connection is made. In the initial stage of card ejection, it is necessary to release the engagement of the contacts; accordingly, a relatively large releasing force is required. As shown in the FIG. 5a, the arcuate portion 57b of the recess 55 engages with the column 73 in the initial stage of card ejection. When the actuating member attached to the engagement member 53 is operated, the area of engagement of the arcuate portion 57b with the column 73 forms a first pivoting center, and the card-ejection member 50 is caused to pivot about this first pivoting center. As a result, the card-engagement member 52 pushes the card C outward. It can be seen that since the distance from the engagement member 53 to the column 73 is longer than the distance from the column 73 to the card-engagement member 52, a relatively large force for releasing the engagement of the contacts is provided by the cam action of the card-ejection member 50.

Figure 5B:
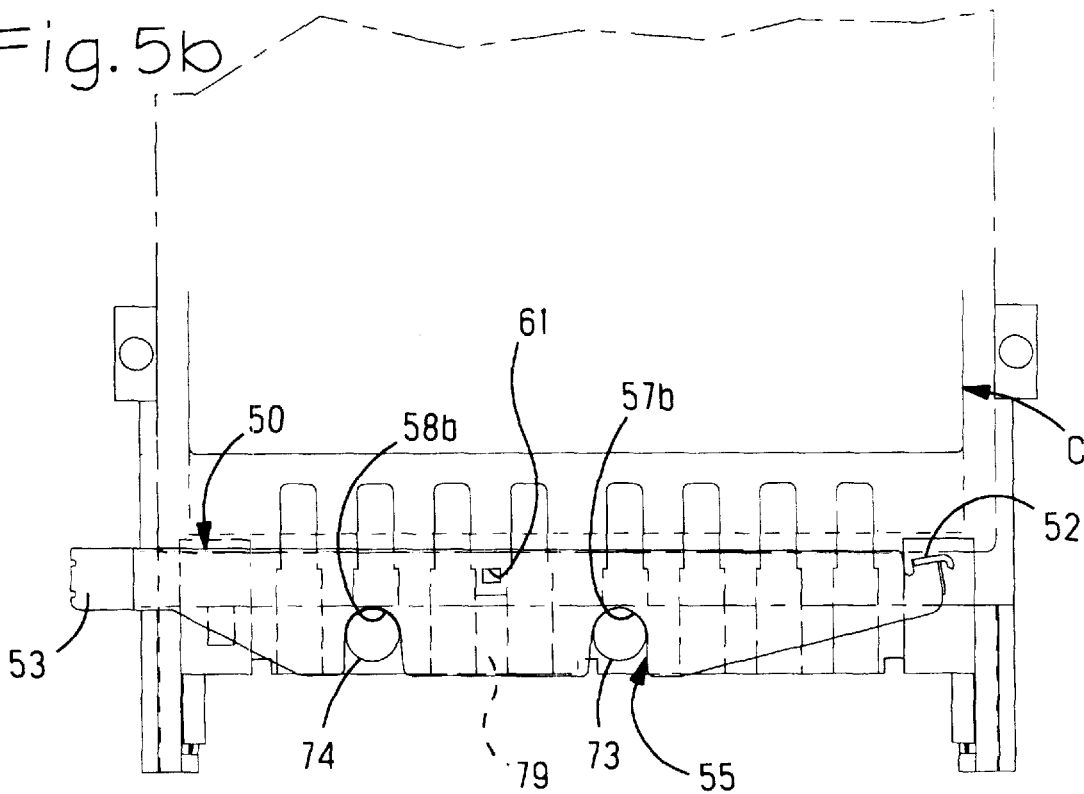
Figure 5C:
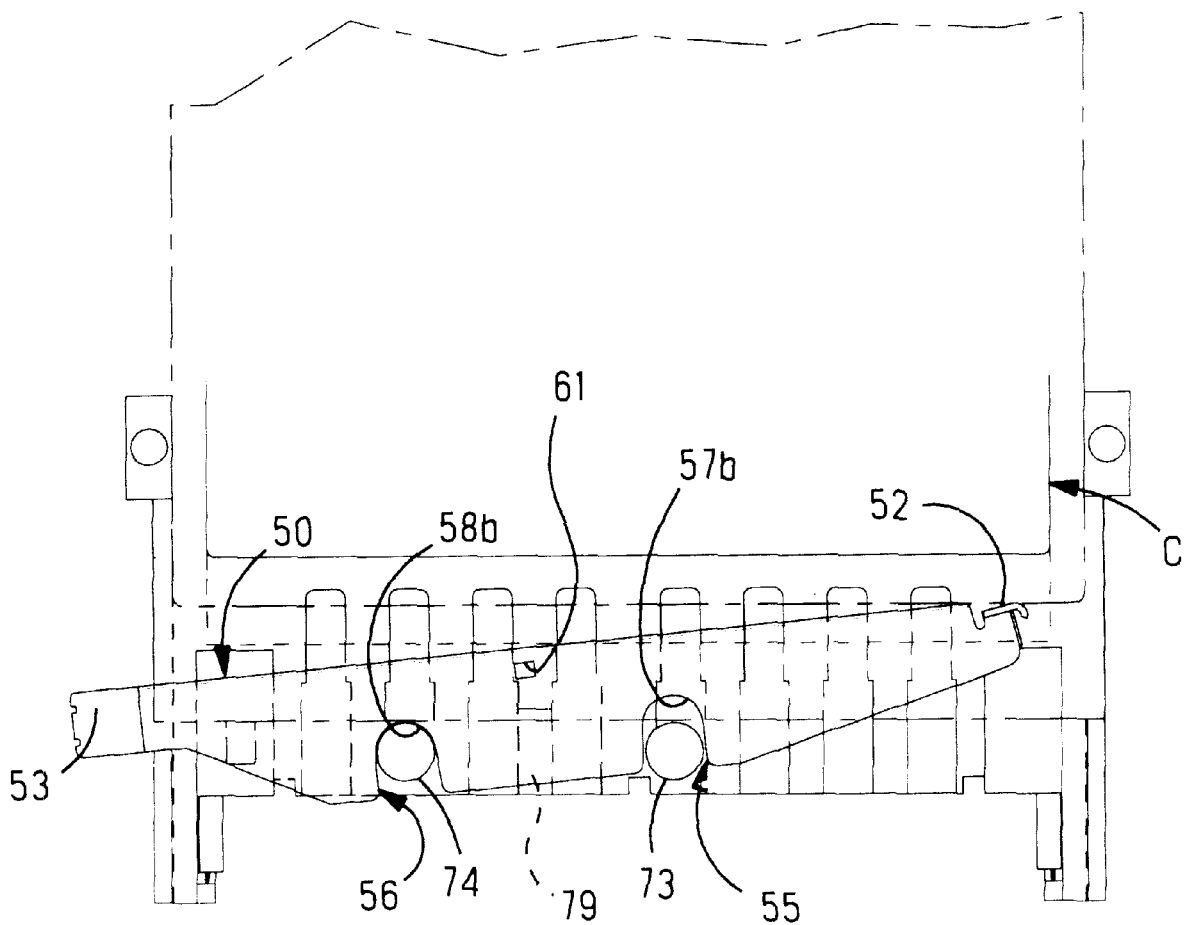

When the card-ejection member 50 is pivoted even further, an engaged relationship is established both between the arcuate portion 57b of the recess 55 and the column 73, and between the arcuate portion 58b of the recess 56 and the column 74, as shown in FIG. 5b. However, when the engagement member 53 is operated even further, a shift to the state shown in FIG. 5c takes place. In FIG. 5c, it can be seen that the pivoting center of the card-ejection member 50 shifts to the area of engagement between the arcuate portion 58b of the recess 56 and the column 74. As seen from a comparison of the distance from the engagement member 53 to the column 74 with the distance from the column 74 to the card-engagement member 52, no large force is applied to the card-engagement member 52; however, since the engagement of the contacts has already been released at this time, the card can be smoothly and quickly ejected by operating the actuating member attached to the engagement member 53.

Furthermore, although this is not shown in detail in FIGS. 5a–5c, the cooperative action between the projection 61 of each card-ejection member 50 and the corresponding housing shoulder 85 merely provides an action which prevents the card-ejection member 50 from slipping out. In the former and latter halves of the pivoting process of the card-ejection member 50, the projection 61 moves through a recessed portion 79 so that there is no interference with the pivoting of the arm 50 used to accomplish an ejection action.

A connector equipped with an ejection mechanism of the present invention has been described above. However, this is merely an example; various modifications and alterations may be made by a person skilled in the art.

The connector equipped with an ejection mechanism provided by the present invention comprises a housing having a slot which accommodates a card-ejection member, and columns which are formed as integral parts of the housing inside the slot, recesses which are capable of engaging with the columns are located in the card-ejection member, and when the card-ejection member is pivoted, respective sets of the columns and the recesses engage with each other thereby forming pivoting centers. Accordingly, the card-ejection member can easily be assembled within the housing, and the number of molds required in order to mold the housing can be minimized, so that the present invention has optimum economic merit.

I claim:

1. A connector equipped with an ejection mechanism for disconnecting electrical contacts between a card and the connector and eject the card from the connector, comprising, a housing having a card-accommodating area for accommodating the card, and a slot disposed in the housing;

columns located in the slot;

a card-ejection member disposed in the slot and having recesses for engagement with the columns; and an engagement member of the card-ejection member for engagement with an actuating member for actuating the card-ejection member and a card-engagement member provided by the card-ejection member, one of the recesses engaging with one of the columns during a first stage of operation of the card-ejection member forming a first pivoting center causing the card-engagement member to engage the card to disconnect the electrical contact between the card and the connector and the other of the recesses and the other of the columns during a second stage of the operation of the card-ejection member forming a second pivoting center causing the card-engagement member to eject the card from the card-accommodating area.

2. A connector as claimed in claim 1, wherein the recesses have an arcuate portion and the columns are cylindrical.

3. A connector as claimed in claim 1, wherein the recesses having thin portions extending therealong are thinner than the thickness of the card-ejection member and the columns have thick portions at the roots thereof that have a larger diameter than the columns.

4. A connector as claimed in claim 1, wherein the card-ejection member has a projection disposed in a recessed section in said housing to prevent the card-ejection member from slipping out of the slot.

5. A connector as claimed in claim 1, wherein the distance from the one column to the engagement member is greater than the distance from the other column to the engagement member.

6. A card connector comprising a housing having a card-accommodating area for accommodating a card;

a base section of the housing having contact-receiving cavities in which electrical contacts are received and a slot therein;

spaced columns located in the slot and extending thereacross;

a card-ejection member disposed in the slot and having recesses for engagement with respective columns; and an engagement member of the card-ejection member for engagement with an actuating member for actuating the card-ejection member and a card-engagement member provided by the card-ejection member so that during operation of the card-ejection member by the actuating member from a first position to a card-ejection position causes alternate engagement of the recesses with the respective columns thereby causing the card-engagement member to eject the card from the card-accommodating area.

7. A card connector as claimed in claim 6, wherein the recesses have arcuate bights and the columns are circular.

8. A card connector as claimed in claim 6, wherein the card-ejection member has a projection disposed in a recessed section in the housing to prevent the card-ejection member from slipping out of the slot.

9. A card connector as claimed in claim 6, wherein the distance from one of the spaced columns closest to the engagement member of the card-ejection member is less than the distance to another of the spaced columns located the furtherest from the engagement member.

* * * * *